R. Frisbie,
Tackle Hook.
N°. 48,336.  Patented June 20, 1865.

Witnesses.
Thos. Tusch
J. M. Connington

Inventor
R. Frisbie
By Munn & Co.
attys

United States Patent Office.

RUSSEL FRISBIE, OF MIDDLETOWN, CONNECTICUT, ASSIGNOR TO IRA K. PENFIELD AND ELMORE PENFIELD, OF SAME PLACE.

IMPROVED TACKLE-HOOK.

Specification forming part of Letters Patent No. 48,336, dated June 20, 1865.

*To all whom it may concern:*

Be it known that I, RUSSEL FRISBIE, of Middletown, in the county of Middlesex and State of Connecticut, have invented a new and Improved Tackle-Hook; and I do hereby declare that the following is a full, clear, and exact description thereof, which will enable others skilled in the art to make and use the same, reference being had to the accompanying drawings, forming part of this specification, in which—

Figure 1:
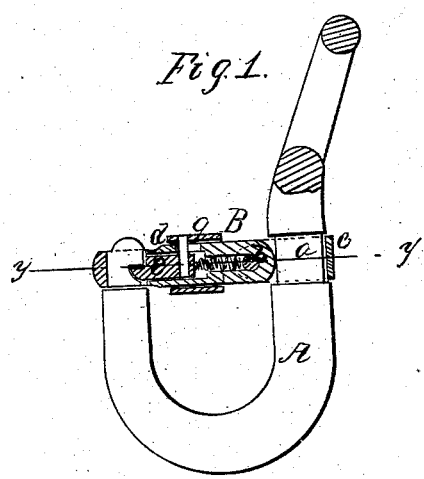
Figure 2:
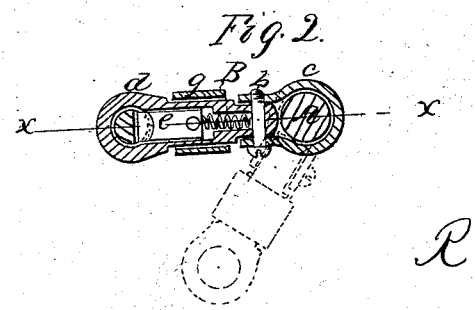

Figure 1 represents a sectional side elevation of this invention, the line $x\ x$, Fig. 2, indicating the plane of section. Fig. 2 is a horizontal section of the same, taken in the plane indicated by the line $y\ y$, Fig. 1, and showing the strap open in red and closed in black outlines.

Similar letters of reference indicate like parts.

This invention consists in a strap which swivels on the shank of a tackle-hook, and which is made in two parts connected by a pivot, in combination with a spring-bolt which locks into a notch on the tip of the hook in such a manner that when the strap is locked to the tip the hook is effectually closed and prevented from unhooking spontaneously, and by pressing back the bolt the strap can be readily unhooked and turned up, so as to open the hook at any moment. Furthermore, by the use of this strap the hook is prevented from straightening out, and it is capable to sustain a much greater strain than it could without the strap.

A represents a hook, cast of metal or made of any suitable material in any desirable manner. The shank of this hook is provided with a neck, $a$, calculated to receive the strap B. This strap is made of two distinct parts, $c\ d$, which are united by a pivot, $b$, so that the part $d$ can be turned up or down to any desired angle, and the whole strap swivels on the shank of the hook in either direction. The part $d$ of the strap is provided with a loop which catches over the tip of the hook, and in order to lock the same a spring-bolt, $e$, is placed in the interior, which is made to catch into a notch, $f$, in the tip of the hook. This bolt is secured to a sleeve, $g$, which fits loosely over the strap, and which may be provided with buttons, so that it can be readily forced back. By pressing back this sleeve the bolt is withdrawn from the notch in the tip and the strap can be turned up and out to the position shown in red outlines in Fig. 2. When this is done the hook is open, and it can be freely hooked to a rope or other article, or unhooked therefrom. When the hook is adjusted the strap is locked by pressing it down over the tip, and it effectually prevents said hook from unhooking spontaneously. Furthermore, by the use of the strap the hook is strengthened and enabled to sustain a very great strain without straightening.

I am aware that straps have been applied to tackle-hooks, and I do not wish to claim the use of the strap as my invention; but

I claim as new and desire to secure by Letters Patent—

A strap which swivels on the shank of a tackle-hook and is made in two parts that are hinged together, in combination with a spring-bolt, constructed and operating substantially as and for the purpose set forth.

RUSSEL FRISBIE.

Witnesses:
GEO. U. BISHOP,
MARCUS E. LYON.